Jan. 12, 1960   R. R. TIEFENTHALER   2,920,642
SAFETY CIRCUIT FOR MANIFOLD VALVES
Filed Jan. 12, 1956   7 Sheets-Sheet 1

INVENTOR.
ROBERT R. TIEFENTHALER
BY Oscar L. Spencer
HIS ATTORNEY

United States Patent Office 2,920,642
Patented Jan. 12, 1960

2,920,642

SAFETY CIRCUIT FOR MANIFOLD VALVES

Robert R. Tiefenthaler, Florham Park, N.J., assignor to Pittsburgh Plate Glass Company, Allegheny County, Pa., a corporation of Pennsylvania Application January 12, 1956, Serial No. 558,818

9 Claims. (Cl. 137—266)

This invention relates to control means for valves in conduits employed for conducting fluids and it has particular relation to control means designed to obviate inadvertent opening of valves in a system of conduits coming from or discharging into a common line or other receiver.

In a system of conduits and valves by means of which a plurality of fluids from different sources and at different times are discharged into a manifold or other common receiver provided with a single pump designed to draw fluids from all of the lines, it is often necessary that the fluids be kept in an unmixed state and therefore that only one of the fluids at any given time be flowed into the common receiver. This requires that the valves of all of the conduits except that of the conduit from the desired source be kept closed while the pump is in operation. If it is desired to draw fluid from any other line, the valve of the first conduit must be closed and then that of the desired conduit be opened.

In a system where the opening and closing of the valves is left entirely in the hands of the operator, mistakes are common. A plurality of valves will inadvertently be opened or the operator will forget to close the valve first used when he switches fluids, with the result that a plurality of fluids which should be kept separate will be mixed together, thus occasioning much loss.

This invention comprises as one feature the provision of electrical controls for valves in a system of conduits feeding fluids from a plurality of different sources in alternation into a common line, manifold or receiver, having a pump or other electrically actuated device for causing fluids to flow therein. In accordance with a form of this invention, the controls are operated by opening or closing of the valves and the controls of the several valves further being in circuit with each other in such a manner that the system can not be operated except when all of the valves are properly set.

For a better understanding of the invention reference may now be had to the accompanying drawings in which like numerals refer to like parts throughout and in which.

Figure 1:
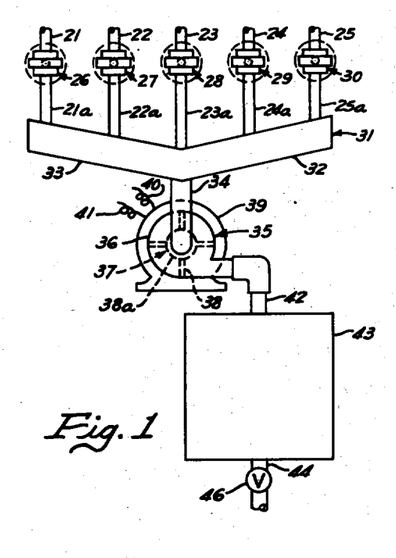
Fig. 1 is a diagrammatical view of a system comprising a plurality of conduits discharging into a common manifold and in which the flow of fluid through the conduit is controlled by valve means constructed in accordance with the provisions of this invention.

In the construction as illustrated in Fig. 1 of the drawings, a plurality of pipes (in this instance five) are indicated at 21, 22, 23, 24 and 25. It will be appreciated that the number (five) shown is merely by way of example. Obviously, the number might be less than this and within the purview of the invention, there is no upper limit of the total number. The pipes are respectively provided with valves 26, 27, 28, 29 and 30 which from the standpoint of valve components are essentially standard in construction. They may, for example, be globe valves or gate valves or any other convenient type designed to be installed in a conduit to control the flow of fluids, such as liquids or gasses in a conduit. For purposes of illustration, the valve is shown as comprising a standard gate type, being provided with a hand wheel upon a stem that operates a slide element. An electrical switch structure is controlled by the movement of the valve stem. The several components of the valve structure and the switch employed in combination therewith will be described in greater detail in a subsequent portion of this specification.

Valves 26 through 30 respectively discharge through lines 21a, 22a, 23a, 24a and 25a into a common manifold structure indicated at 31 and being shown as comprising convergent branches 32 and 33, which at their point of union, discharge into a common trunk conduit 34. In this embodiment of the invention, the conduit 34 feeds into a pump 35 which may be of standard design, either rotary or reciprocating, but for purposes of illustration it is shown as being of the centrifugal type comprising an outer casing 36 in which is a rotor 37 having vanes or paddles 38 mounted upon an axially disposed rotatable core or shaft 38a within the casing. The pump may be driven by an electrical motor indicated at 39 having power connections 40 and 41 joined thereto in conventional manner.

The pump discharges through a line 42 which for purposes of illustration, is shown as leading to a receptacle 43 which may be a tank or mixer or other appropriate piece of apparatus of any desired type. Fluids in the receptacle may be drawn off, as for example from the bottom through an appropriate conduit 44 having a valve 46 which may be entirely in the control of the operator.

Figure 2:
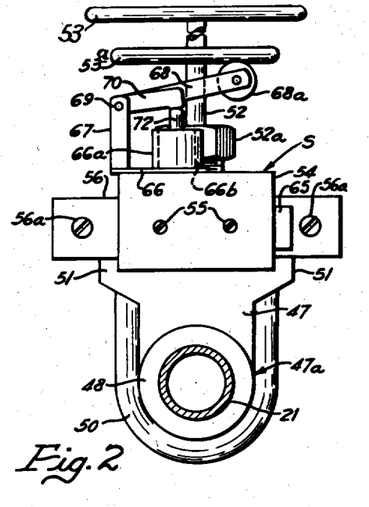
Fig. 2 is a side view of a valve and a control device for the electrical circuit embodied in the invention.
Figure 3:
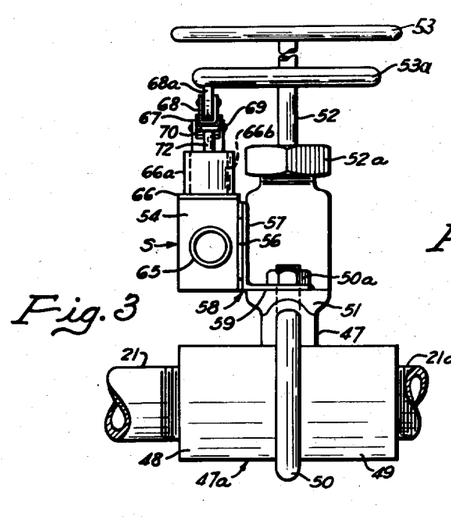
Fig. 3 is a view observing the construction as shown in Fig. 2 at right angles with respect to the angle of view of the former figure.

A valve structure, shown in Figs. 2 and 3 which conveniently may be employed, may be of the gate type (gate not shown) and comprises a body portion 47 housing a slide and gland structure (not shown) and coupling portion 47a fitting upon the lower end thereof. This valve will be described as connecting lines 21 and 21a but the same structure may be employed in all of the lines. The coupling portion is provided with an inlet 48 and an outlet 49 adapted to be connected respectively to the pipes 21 and 21a. The connections may be by conventional screw coupling (as illustrated) or if preferred flange couplings or other design of coupling may be employed. The specific form of the coupling is not important in the present invention. The portion 47a is held in position upon the portion 47 by means of a U-bolt 50, the bight of which extends around said portion 47a and the upper ends of which extend through holes in ears 51 on the sides of the body 47. Nuts 50a on the ends of the U-bolt secure the latter in place.

The slide is also provided with a conventional valve stem 52 extending through a cap nut as at 52a and having a hand wheel 53 by means of which the valve stem may be rotated in order to raise or lower the valve gate. The internal structure of the valve has not been illustrated because such constructions are common and well recognized. For purposes of operating the electrical switches to be described, the valve stems may also be provided with discs or wheels 53a which actuate the switch arms in a manner to be described. Obviously, contact may be made between the hand wheels and the switch arms, but this sometimes is objectionable, as the hands of the operators may be soiled with oil or other materials, and this may then be transferred to the hand wheels, and by the latter to the switches.

Each valve is provided with a switch element designated broadly as S and being designated individually as SI, SII, SIII, SIV and SV, designed to be operated by the opening and closing of the valve and being suitably connected into the electrical circuit (hereinafter to be described) of the system whereby to obtain the desired automatic control of the flow of fluid in the several conduits controlled by the electrical system. These switches may be mounted in various ways upon the valves, or upon the conduits or upon other suitable support; they may also be built into the valve body or into an appropriate chamber in the cap nut 52a.

For purposes of illustration, a switch is shown as comprising a casing or body portion 54 inclosing the several electrical contacts requisite to such switch and being secured, as for example by screws 55 extending through the casing into openings in a mounting plate 56 which is secured by screws 56a in vertical flange 57 of transverse bar 58 having horizontal flange 59, with a cut out portion (not shown) fitting transversely of the body 47. The nuts 50a securing the U-bolt 50 from displacement from its openings in the ears 51, also lock the flange 59 of the transverse bar.

Each switch S is provided with a coupling 65 for connection to a suitable conduit, housing the necessary wiring connecting the switch into the electrical circuit of the system. The actuating components of the switch may be of various conventional types. They may be mercury switches having the proper number of poles and throws. They may all be inbuilt into single switches, or a plurality of single pole, single and/or double throw switches may be used to obtain a similar effect. Any other type of switch or switches which can be operated by opening or closing of the valves may be used. For purposes of illustration, switches of the so-called micro switch type are shown. Micro switches are sold by the Micro Switch Division of the Minneapolis-Honeywell Regulator Company. Since these switches are conventional commercial products, only brief description thereof is deemed to be necessary. If the fluids being handled are volatile and inflammable, the switches should be explosion proof.

Each switch comprises an external actuating mechanism which in the form illustrated, comprises a bracket 66 disposed upon the top of the switch housing 54 and being so held by a nut 66a threaded upon a tubular boss 66b upon the housing 54. It is further provided with an angularly disposed post 67 which at its upper extremity is bifurcated to receive an extremity of a swinging switch actuating lever 68 rigidly mounted on pintle 69 extending through the bifurcated portion. The switch actuating mechanism also includes an arm 70 which commonly with the arm 68 is rigidly secured by appropriate means upon the pintle 69 which is journaled in the bifurcated portion of the member 67. The two arms 68 and 70 may be angularly adjusted with respect to each other by means (not shown) as conditions may require. Arm 70 makes contact with a plunger 72 which projects into the housing 54 for purposes of operating the switch blades.

At its outer extremity, the arm 68 is provided at 68a with a roller which makes contact with a smooth surface upon the lower face of the wheel 53a in such manner that when the wheel is rotated, thus raising or lowering the valve stem 52, the arm 68 travels up or down causing the plunger 72 to raise or lower to bring the switch blades or leaves into desired position.

Figure 4:
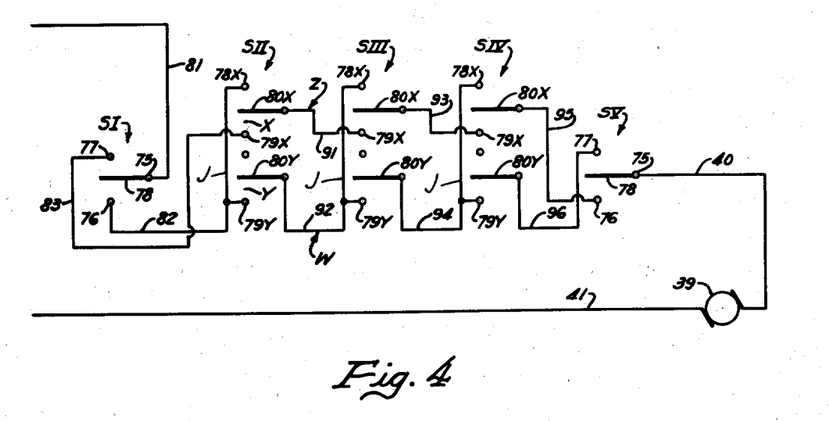
Fig. 4 is a wiring diagram illustrating the electrical system employed in connection with the controls.
Figure 9:
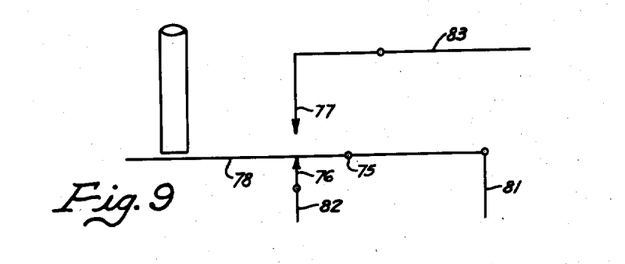
Fig. 9 is a schematic view of the electrical components of a single pole, double throw switch which may be employed in the practice of the invention.

In Fig. 4 of the drawings, is illustrated a wiring diagram for the several switches S, indicated as SI, SII, SIII, SIV and SV respectively, as associated with the valves 26 through 30 in Fig. 1 of the drawings. The terminal switches SI and SV in the series may conveniently be of the single pole, double throw type shown diagrammatically in Fig. 9. Each comprises intermediate terminal 75 and contacts 77 and 76. The latter terminals correspond respectively to the open and closed positions of the associated valve. An operable blade or connector element 78 is joined electrically to terminal 75 and is adapted to make contact in alternation with spaced contacts 76 and 77. Both of the terminal switches may be identical in construction and therefore but one (assumed to be SI) has been described, the description for one being adequate for the other. Such switches are customarily sold as single pole, double throw switches. A double pole, double throw switch may also be employed with but a single pole connection into the circuit so as to provide in effect a single pole, double throw switch.

Figure 10:
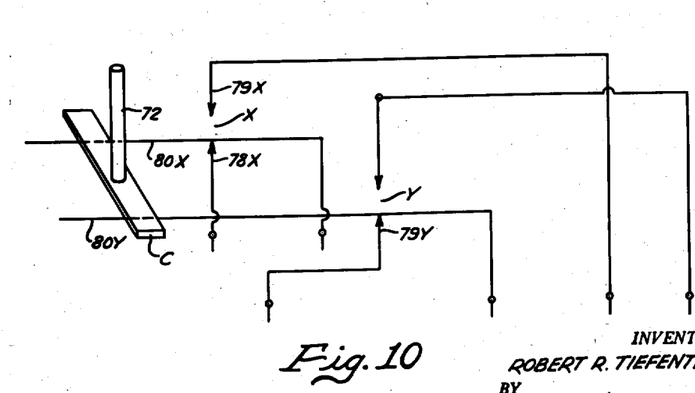
Fig. 10 is a schematic view of the electrical components of a double pole, double throw switch which is made to perform the function of a single pole, double throw switch and a single pole, single throw switch operated by a common push rod.

The intermediate switches SII, SIII and SIV of the system preferably may be double pole, double throw micro switches with one contact of one section being left unconnected, thus obtaining in effect a single pole, double throw section X and a single pole, single throw section Y in a common housing. The connections are illustrated diagrammatically in Fig. 10. Contacts 78X and 79X are provided for the double throw, single pole sections and contact 79Y is provided for the single throw section. Connectors or blades 80X and 80Y make selective engagement with these contacts and are operated simultaneously by a cross bar C on the lower end of the push rod 72. In Fig. 4, the several blades or connectors are shown in a neutral position. In actual operation they would remain in such position but momentarily. Switches of the foregoing type are sold by the above mentioned company under the catalogue number DTE–2RN2. It is understood that other switches of different catalogue numbers designed for various loadings are also available.

In the system as illustrated in Fig. 4 of the drawings, a power line 81 is connected to the blade or leaf 78 of switch SI and the contacts 76 and 77 are respectively connected to lines 82 and 83 so that power is supplied thereto in alternation, dependent upon whether the valve 21 is opened or closed. It is to be observed that line 82 has a jumper portion J interconnecting a terminal 78X and terminal 79Y in each switch section X or Y so that regardless of which of the terminals 76 and 77 of switch SI are actuated, a selectable terminal in each section of switch SII will be activated. Blades or connectors 80X and 80Y are disposed to make selective engagement with the several contacts dependent upon whether the valve 27 is opened or closed and these connectors are in turn joined to lines 91 and 92 which essentially correspond to the lines 83 and 82 already described. The line 92 is joined to terminals 78X and 79Y of switch SIII corresponding to the terminal 79X and 79Y in the switch SII while the connector 80X of switch SII is joined by the line 91 to terminal 79X of switch SIII corresponding to the terminal 79X of switch SII.

The connectors 80X and 80Y of switch SIII are in turn, connected by lines 93 and 94 to terminals of the switch SIV which correspond to the terminals already described in respect to the switches SII and SIII. The connector elements 80X and 80Y of the switch SIV are also connected to the lines 95 and 96 joined to the alternative contacts 76 and 77 of the switch SV, the contact element of the latter being connected by line 40 to an electrically responsive device which may be a signal such as a light or a bell which will warn the operator if the valves are not properly set. The device may also be a starter for a motor or a relay designed to operate a signal, or to operate a motor or a starting device for such motor upon a separate circuit. For purposes of illustration the device is indicated as being motor 39 connected directly to the line 40. The motor is further connected to the power or bus line 41, thus completing the circuit. From the contacts of the switch SI to the contacts SV two separate parallel conductive lines or paths Z and W for electrical current are provided. The first comprises conductors 83, 91, 93, 95 and the sections X of the intermediate switches SII, SIII and SIV. The second comprises conductors 82, 92, 94 and 96 and the sections Y of the foregoing switches. The conductors J between contacts 78X and 79Y, it will be observed, provide means for jumping the current across from one path to the other whenever a switch is opened. Means is thus provided whereby current can be switched from one contact to the other on the terminal switch SV merely by opening any intermediate valve. Also the paths for activation (W or Z) are selectable by opening or closing of the single pole double throw terminal switch SI. It is to be noted that path Z from terminal 77 of switch SI crosses over to terminal 76 of switch SV and conversely path W from terminal 76 of switch SI crosses over to terminal 77 of switch SV.

Figure 5:
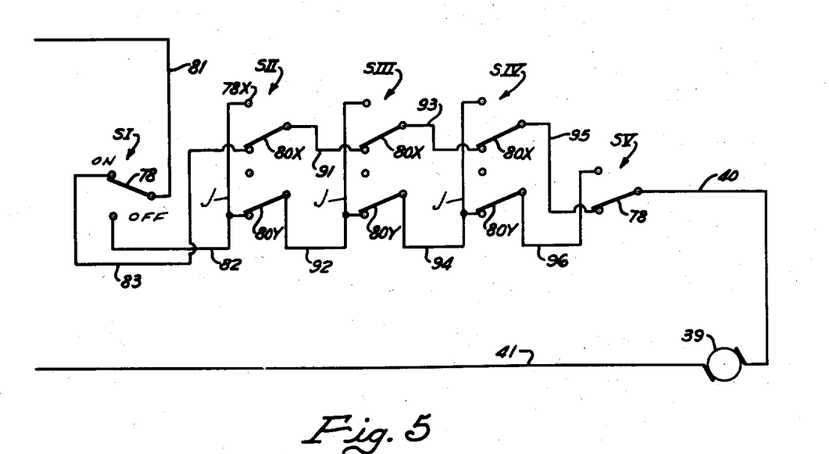
Fig. 5 is a second wiring diagram illustrating the positions of the controls when one of the valves is open.

In the operation of the system, it will be assumed that a single valve, e.g. 26 is opened, in which instance the contact elements 78 will be in the position indicated in Fig. 5. Power can then flow from line 81 through connector 80X of the switch SII to line 91 and thus on through the switch SIII through line 93 to switch SIV, out from switch line 95, through SIV, through the switch SV to the line 40 leading to the motor 39 operating the pump 35. The latter is thus actuated to draw fluid through the line 34, header or manifold 31 and the pipe line 21 from the desired source.

Figure 6:
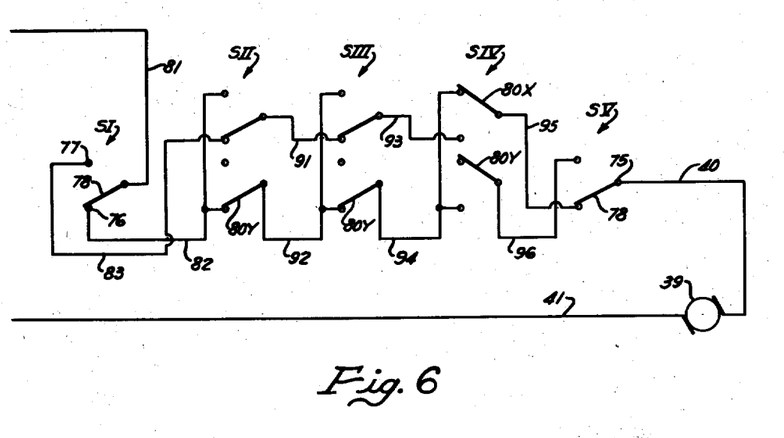
Fig. 6 is a further wiring diagram illustrating the circuit when still another of the valves is open.

Assuming now that it is desired to draw fluid through another line, e.g. the line 24, the positions of the several switches in the system, when the valve 29 is opened and the remainder of the valves are properly closed, is illustrated in Fig. 6 of the drawings. It will be observed that power to operate the motor of the pump can then travel from line 81 through connector 78, line 82; connector 80Y of switch SII, through connectors 80Y of the switches SII and SIII and intermediate lines 92 and 94, across connector 80X of switch SIV to switch SV and finally through line 40 to motor 39, thus operating pump 35, and drawing fluid from line 24 and it alone.

Figure 7:
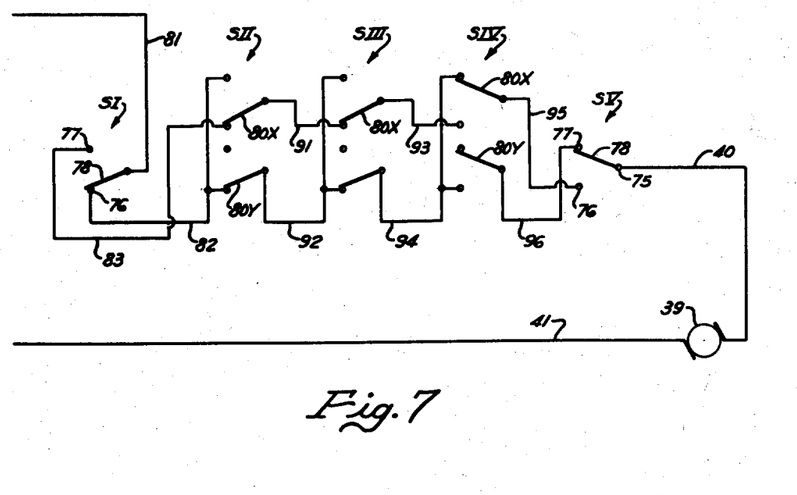
Fig. 7 shows how the circuit is interrupted when a plurality of valves are open.

In Fig. 7 of the drawings is illustrated the safety feature of the invention in which it will be assumed that a pair of valves have been inadvertently opened. In this instance, the valves selected are 29 and 30. Under these conditions power can flow from line 81 through line 82 and the blades or connectors 80Y of the closed switches SII and SIII, but on switch SIV is jumped to the X section of the switch which is connected to contact 76 of switch SV. The latter is opened by reason of the opening of valve 30. Power can not reach the motor 39. Fluids, therefore, can not move in the system.

Figure 8:
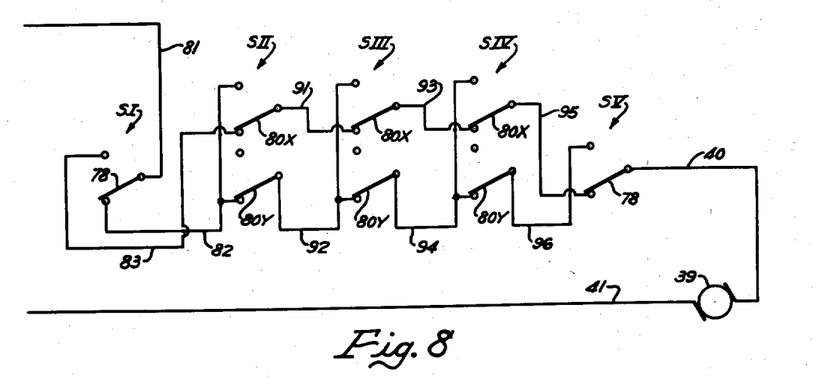
Fig. 8 illustrates a circuit when all of the valves are closed.

The condition of the circuit when all of the valves are closed is illustrated in Fig. 8 of the drawings in which it will be observed that the flow of power through the X sections of the switches SII, SIII and SIV is interrupted in the double throw, single pole switches SI and SV, while that through the Y sections is interrupted at the double throw, single pole switch SV. From reference to this figure it will be obvious that assuming any one of the valves of the series is opened, power will be restored through the circuit to actuate the motor of the pump. If any second valve is then opened, the cicuit of necessity will be broken in the switch corresponding to that valve.

Figure 11:
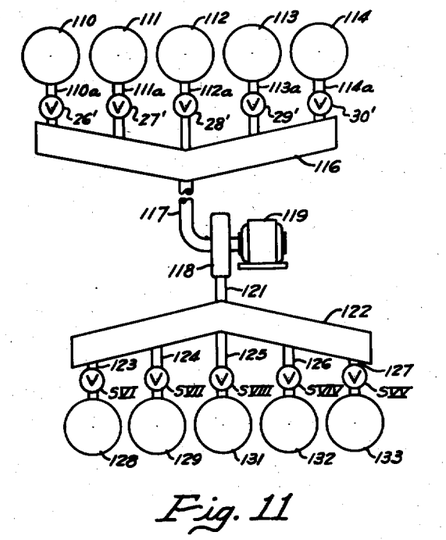
Fig. 11 is a diagrammatical view of a system of conduits drawing fluids from a plurality of reservoirs and feeding the same through a single pipe line and pump into a series of receivers.
Figure 12:
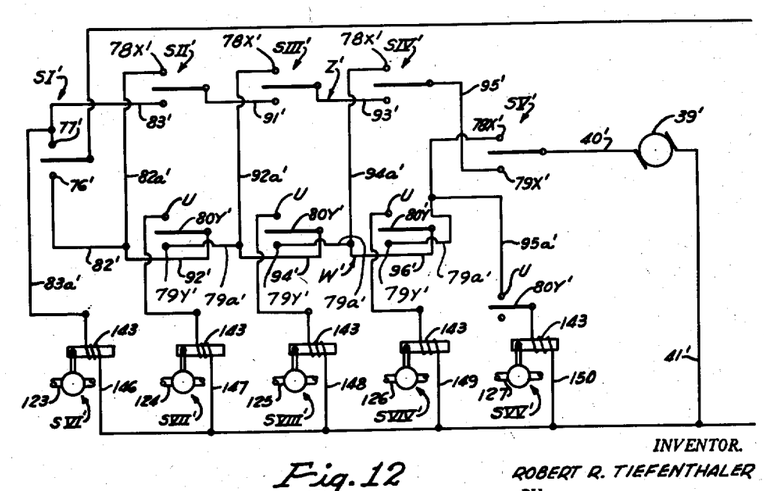
Fig. 12 is a diagram of the circuit controlling the valves and the pump of the system as shown in Fig. 11.

In the embodiment of the invention disclosed in Figs. 11 and 12 of the drawings, a system of supply tanks is provided in one location and at a distance a second system of tanks constituting receivers is provided. The two systems are interconnected by conduits involving outlet pipes discharging into an outlet manifold, a discharge manifold and discharge connections leading from the latter to the individual receiver tanks. The two manifolds in turn are connected by a trunk conduit and a motor driven pump so that fluid can be drawn from the supply tanks and discharged to the receiver tanks by a single motor and pump.

A system of switches is provided which is like that already described, each embodying a double throw, single pole section and a single pole, single throw section operated by a common plunger element which is controlled by opening or closing of the valve. The switches are connected into a basic circuit essentially the same as those already described and are effective selectively to allow fluid to flow from one of the first series into the manifold when a desired valve is opened, but to preclude flow when a second valve is opened.

The system further comprises solenoid valves disposed in the discharge conduits and being electrically connected with the switch elements already referred to so that when a hand valve is opened or closed, the corresponding solenoid valve is opened or closed to assure that any liquid flowing in the system is conveyed to the proper receiver.

As shown in Fig. 11 the apparatus embodies a system of supply tanks 110, 111, 112, 113 and 114, each discharging through an outlet conduit which conduits are indicated respectively as 110a, 111a, 112a, 113a and 114a and each being connected to outlet manifold 116. The valves 26' through 30' are disposed in the lines and are the same as valves 26 through 30 in Fig. 1.

Outlet manifold 116 discharges into one section 117 of an interconnecting trunk conduit which is connected to a pump 118 driven by motor 119. Fluid from the pump is discharged through a section 121 of the interconnecting conduit to a discharge manifold 122 having connections through conduits 123, 124, 125, 126 and 127, adapted to discharge into receiving tanks 128, 129, 131, 132 and 133. The solenoid valves, designated broadly as S.V.I, S.V.II, S.V.III, S.V.IV, and S.V.V are disposed in the lines above referred to and are connected with the electrical switches controlling motor 119, operated by opening and closing of valves 26' through 30'.

The switches are designated respectively as SI', SII', SIII', SIV' and SV'. They are micro switches SI' being the same as SI, and SII', SIII' and SIV' are the same as SII, SIII and SIV, but SV' is double pole, double throw like SII, SIII and SIV. The mounting of the switches upon the hand valves may be the same as that shown in Figs. 3 and 4.

Figure 15:
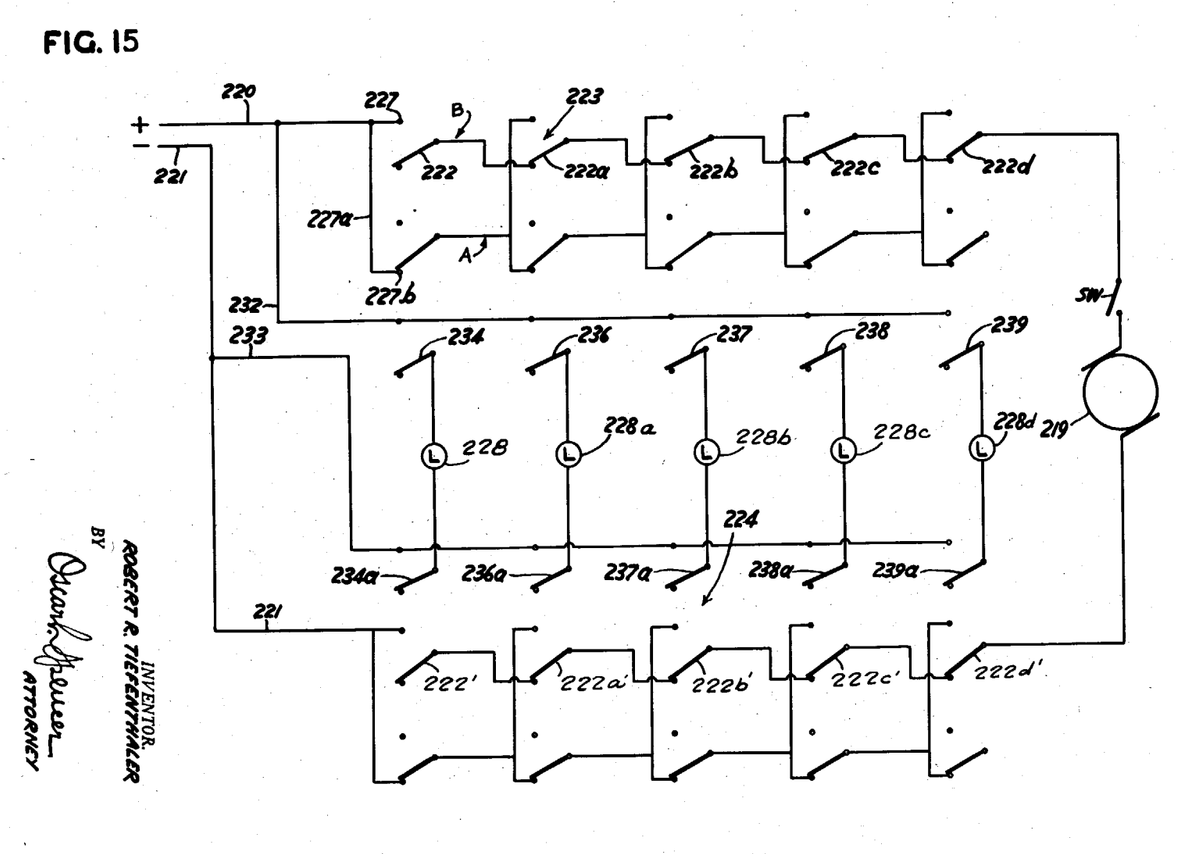
Fig. 15 is a wiring diagram showing an arrangement of switches and tell-tale lights suitable for use where valves are disposed in the branches of each of two manifolds connected by a trunk line.

The solenoid valves are illustrated diagrammatically in Fig. 15. Each comprises a valve element 140, which may be rotary and may be a commercial product. For purposes of illustration, the specimen is assumed to be of valve SVI in line 123, but the others are, or may be identical. Operating arm 141 of the valve is connected to plunger 142 of a magnetizable material operating in and energizable in a solenoid 143, which is connected to switch SI'. Tension spring 144 connected to the arm urges the arm to normally close the valve.

A wiring diagram of this embodiment of the apparatus is shown in Fig. 12 of the drawings. In Fig. 12, the several switches, as already pointed out, in the supply lines are designated respectively as SI', SII', SIII', SIV' and SV'. The switches SI' and SV' are terminal switches in the series and the switch SI' is single pole, double throw. SV' is double throw, double pole like the intermediate switches.

The circuit involving the switches and motor 39' is similar to that shown in Fig. 4, comprising 2 parallel paths Z' and W' from contact elements 76' and 77' of switch SI' to contacts 78X' and 79X' of switch SV'. Path Z' comprises conductors 83', 91', 93', 95' and is available if SI' is open and the several intermediate valves and end valve SV' are closed. Closing of the switch SI' shunts the current through path W' comprising lines 82', 92', 94' and 96' (assuming the switches SII', SIII', SIV' and SV' to be closed).

It is important to note that the cross branches 82a', 92a', and 94a' interconnecting lines 82', 92' and 94' with contact points 78X' of the intermediate switches provide for shunting current across from the W' to the Z' paths, when an intermediate valve is opened. When valve 30' is opened and the other valves of the series are closed, current is drawn through the W' circuit to activate the motor or starter or signal, etc.

It is to be noted that in Fig. 12 the connections 82', 92', 94' and 96' of the switch blades 80Y' and the contacts 79Y' are in reverse with respect to their respective positions as shown in Fig. 4, lines 82', 92', 94' and 96' being joined by line 79a from the contact to the switch blade 80Y' of the succeeding switch rather than from the preceding switch blade to the succeeding contact 79Y'.

Line 83' is connected by line 83a' with solenoid valve SVI', so that when the hand valve 26' (shown in Fig. 11) is opened, the coil 143 is activated to open valve SVI'. Similarly contacts U (which in Fig. 4 are unused) of the double pole, double throw switches SII', SIII' and SIV' are connected to coils 143 of solenoid valves SVII', SVIII' and SVIV' so that opening of any one of the valves 27' through 30' activates the corresponding solenoid. Contact U of switch SV' is connected by line 95a' to contact 78X' of switch SV' of the circuit above described and the blade or connector 80Y' of this switch is connected to coil 143 of solenoid valve SVV', so that when all of the valves of the 26'–30' series (shown in Fig. 11) except 30' are closed, the solenoid valve is opened. Each of the several coils 143 of the solenoid valves are connected at one end by lines 146, 147, 148, 149 and 150 with the bus bar or power line 41' to complete the circuits thereof.

The foregoing circuit assures that the opening of any hand valve in the supply circuit will energize both the motor 39' and the proper solenoid valve to shunt the liquid being transferred through the trunk line 117 to the proper circuit.

Figure 16:
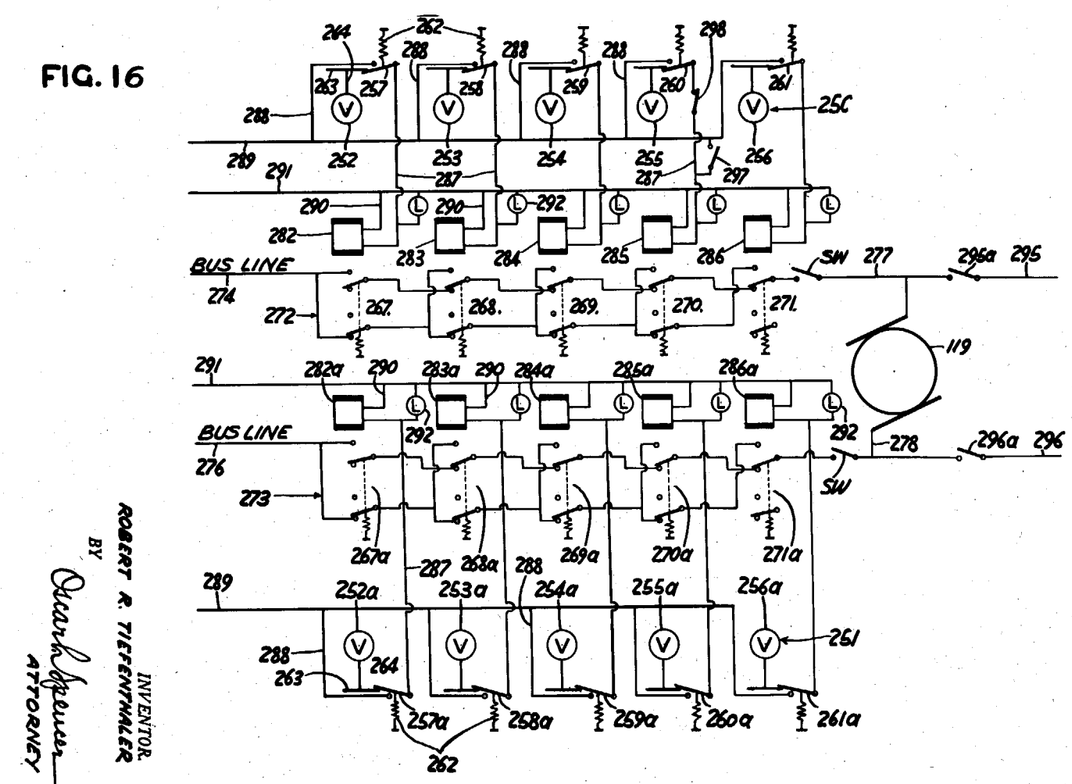
Fig. 16 is a wiring diagram of a circuit similar to that of Fig. 15 but in which the double pole, double throw switches are electromagnetically operated.

If desired the function of the contacts U in the several switches SII', SIII', SIV' and SV' can be assumed by those of a pair of single pole, double throw switches, dually mounted upon the valves 26' through 30'. The mounting of such a switch is shown in Fig. 16, where such switch is indicated at N as being mounted upon a bar 58' similar to bar 58 and being similarly mounted. A single pole, single throw switch may also be mounted upon valves which are further provided with double pole, double throw switches. This arrangement is convenient for the circuits illustrated in Figs. 15 and 16.

Figure 13:
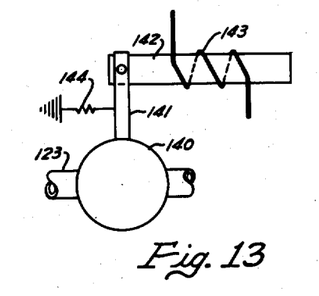
Fig. 13 is a diagrammatical view of a solenoid valve which may be employed in combination with the construction shown in Figs. 11 and 12.

It will be appreciated that in some instances, gravity may be employed as the means for impelling gases, liquids and finely divided solids through the conduits herein disclosed. For example, in the system of Fig. 1 the container 43 may be sufficiently low that the liquids will flow without pumps 35. The latter, accordingly, may be replaced by a solenoid valve such as that of Fig. 13, the coil 143 thereof, being wired into the circuit in place of the motors 39.

In those instances where a pair of manifolds having branches connected by a trunk conduit are employed, it will be apparent that the pumps may be so connected, or the slope may be such that the fluid will flow in either direction in the conduits. Reversible pumps may also be employed so that the fluids may be flowed in either direction at will.

Fig. 15 illustrates a pair of duplicatory interlocked circuits for controlling a single motor for driving a pump. One of these circuits is shown disposed in each of the power lines of the motor so that the operation of a switch in each line is required in order to admit current to the motor. This arrangement is especially suitable for use where two branched manifolds such as are shown in Fig. 11 are interconnected by a trunk pipe line having motor operated pump and the valves of the branches are all of the manual type shown in Figs. 2 and 3. One of the circuits may be controlled by the valves in the branches of one manifold while the other circuit is controlled by the valves in the branches of the other manifold. This arrangement assures that but a single valve of each manifold is open at a time. If two valves on either manifold are opened, the motor is stopped automatically.

The manifolds, branches, trunk line, pump and motor also correspond to those of Fig. 11. In the interest of brevity, it is not deemed to be necessary to repeat the illustration and description of these. Reference to the former figure is sufficient.

The motor 219 driving the pump and corresponding to the motor 119 is connected to bus bars or power lines 220 and 221 which respectively are provided with switches 222, 222a, 222b, 222c and 222d, and 222', 222a', 222b', 222c' and 222d' and interlocking circuits therefor indicated generally as 223 and 224 and each essentially corresponding to the single interlocked circuits already described in Figs. 4, 5, 6, and 7 with the minor distinction that the first switch 222 corresponding to the switch SI in Fig. 4 is of the double throw, double pole type corresponding to the switches SII, SIII and SIV in Fig. 4. In this construction, the contact 227 of the first switch is joined to the power line 221 and this contact is further joined by line 227a to the contact 227b in the remaining section of the switch, so that the two sections A and B of the switch combine to give a double throw effect which is the same as that of switch SI in Fig. 4.

The first switch in the power line 221 is similarly connected. The remaining switches in each of the two circuits are connected in the same manner as the switches SII, SIII, SIV of Fig. 4 and further discussion thereof is deemed to be unnecessary.

Figure 14:
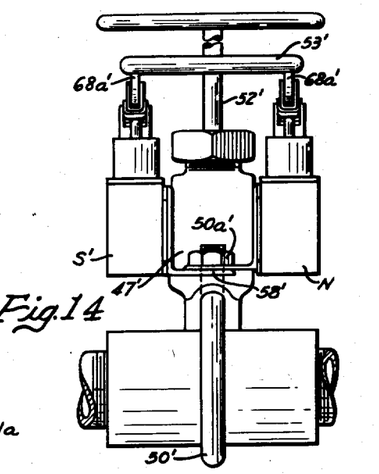
Fig. 14 is an elevational view of a valve structure having two switches mounted thereupon and being suitable for use in the embodiments of the invention as shown in Figs. 11, 12, 17 and 18.

In the construction as illustrated, a series of tell-tale lights 228, 228a, 228b, 228c and 228d are shown and these are designed to indicate when a pair of valves in separate circuits are opened. These lights may be disposed in any convenient position, for example, in contiguity to one of the valves. The circuits of the lights preferably are separate from the circuits 223 and 224 though they may conveniently be supplied with power from the common bus line 220 and 221. The power lines for the lights are indicated respectively as 232 and 233 which are provided with switches constituting in effect single pole, single throw switches 234, 236, 237, 238 and 239, and 234a, 236a, 237a, 238a and 239a. These switches may be mounted as indicated in Fig. 14 upon the same brackets supporting the switches of the circuits 223 and 224 so that when a valve is opened the corresponding switch operating the designated tell-tale light is also operated. They may also comprise an added set of poles and blades in the double pole, double throw switches of Figs. 2 and 3. It will be observed that when any two corresponding valves, for example the first of the valves in each of the manifolds, is opened the corresponding switches 234 and 234a to a tell-tale light are operated simultaneously, thus causing the tell-tale light between to glow thereby indicating that the valves are in phase with each other and that the system is in proper condition to operate and that the pump will then draw liquid from the proper container, e.g. first container in the supply series and will discharge it into the corresponding container in the receiver system.

Assuming that the valve opened in the discharge system does not correspond to the valve in the receiver system, none of the lights will glow, though the motor on the pump will operate if a valve in each circuit is open. However, the lack of proper tell-tale lighting indicates that the system is not in proper position for operation and the operator can then correct his mistake in the opening of the second valve controlling the second circuit. While the tell-tale lights may be disposed in any convenient position, if the pairs of valves which they interconnect are far apart, it is often preferred to place said lights near the valves on the branches of one manifold. Then if the corresponding valve in the distant manifold system is opened first, the opening of the valve near the light will cause the light to glow to appraise the operator that the opened valves properly match. Should the opening of the valve near a light not cause the light to glow, the operator is warned that the corresponding valve in the other manifold system is not opened. He can then shut the opened valve and open the other before damage is done, or he can make such other correction as is desired.

It is also feasible to dispose the tell-tale lights in a group near the motor, the latter being provided with a safety switch SW which is kept open until the glow of a tell-tale light informs the operator that properly paired valves in each manifold system are open. Closure of switch SW then starts the motor to pump fluid between the desired containers.

It will be apparent that assuming that the proper valve in each of the two manifold systems are open to operate the motor and concurrently to light up the tell-tale light shared between them, the opening of a second valve in either one or both of the circuits 223 and 224 will shut off the power to the motor thus causing pumping to cease until the extra valve or valves are closed.

In Fig. 16 is illustrated a further modification of the system as shown in Fig. 15, but in this instance, the double pole, double throw switches are electromagnetically operated by relay coils which are connected to the single pole, single throw switches of Fig. 15.

In the arrangement, the manifolds, branches, valves, trunk line, pump and motor may be identical with the arrangement shown in Fig. 11. The valves are indicated diagrammatically in Fig. 16, but reference may be had to Fig. 11 for understanding of the other mechanical features of the system.

The system is shown as comprising two sets 250 and 251 of valves, the sets being disposed respectively in the branches of the discharge and receiving manifolds. The individual valves of set 250 are designated as 252, 253, 254, 255 and 256. The valves of set 251 are indicated as 252a, 253a, 254a, 255a and 256a.

Each of the valves is provided with a single pole, single throw switch, these being designated respectively as 257, 258, 259, 260, 261, 257a, 258a, 259a, 260a and 261a. These switches may be micro switches and are urged toward closed position by spring means illustrated diagrammatically at 262. They are urged to open position by suitable operating members 263 on the valve stems 264, in the manner already described.

Double pole, double throw relays acting as electrically operated switches are also provided, these being indicated as 267, 268, 269, 270, 271, 267a, 268a, 269a, 270a and 271a. The switch elements in these relays are the same as shown in Fig. 15 and they are interconnected in circuits 272 and 273 which are the same as the circuits 223 and 224 of Fig. 15. Reference may be had to the latter figure for a full understanding of Fig. 16. Power is supplied to these circuits through switches 267 and 267a by bus lines 274 and 276 and is transmitted from the last switches 271 and 271a to the driving motor 119 of the pump by lines 277 and 278.

Means automatically to operate the double pole, double throw switches when proper combinations of valves are opened, comprise relay coils or solenoids 282, 283, 284, 285, 286, 282a, 283a, 284a, 285a and 286a which are joined respectively to the several single pole, single throw switches 257 through 261 and 257a through 261a, by lines 287. The single pole, single throw switches are further connected by lines 288 to lines 289 of a source of current, and the solenoids are further connected by lines 290 to the common lines 291 which provide the return for the source of power. Obviously, the bus 274 may optionally be joined to the lines 289 by lines (not shown) while the other bus 276 is joined with the other lines (291). This permits the use of a single source of current both for operating the solenoids and also for driving the motor. However, it is often preferred to use different voltages or different types of current for the solenoids and the motor 119. In the latter event, the supply source for the solenoids and the motor will be different.

The signals 292 indicated as lights connected in parallel with the relay coils or solenoids show when a particular pair of valves (e.g. 254 and 254a) have been opened.

The system shown in Fig. 16 is particularly well adapted for use where the manifolds are widely separated and are connected by a long trunk line. The single pole switches may be disposed upon the valves; the relay switches need not be associated with the valves except by single electrical conductors (lines 287). A convenient arrangement is to dispose all of the relays and the attendant signals near the valves in the branches of one of the manifolds, such as 116. The valve of a branch of the other manifold, such as shown at 122 in Fig. 11, may then be opened after which the desired valve of the manifold contiguous the signal is opened. The signals will appraise the operator if the last valve opened is correct. All signals are easily seen when the final valve is opened.

Lights have been described for giving signals of the opening of the valves. Obviously, these may be replaced by electrically operated audible signals or by signals having an electrically operated flag or other visual indicator.

Safety switches SW are shown in line 277. These may be kept open until proper signals are received from communicator system and then closed to start the motor.

It will be observed that lines 277 and 278 are also connected to lines 295 and 296 having switches 295a and 296a. The latter lines are connected to a source of power such as the bus lines 274 and 276 so that should it ever be desired, the motor 119 can be operated independently of the safety system. Switches, such as switch 297, may be shunted across the switches 257 through 261 and 257a, through 261a and likewise switches, such as switch 298, may be disposed in lines 287 so that if desired these switches 297 and 298 can be set to permit the operation of the rest of the valves independently of this valve. Switches 297 and 298 are shown by way of illustration as being applied to but a single valve, e.g. 255, however, it will be apparent that they be applied to any or all of the others, to permit pumping through any and all combinations of the branch lines of the manifolds. Normally, the switch 298 will be maintained closed and the switch 297 is open and they are not manipulated except in those instances in which unusual circumstances arise when it may be desired to cut out the electrical safety systems.

In some instances, gravity may be relied upon to produce flow of fluids in the trunk line between the two manifolds. In that case, motor 119 and the pump driven by it may be eliminated. A mere valve is placed in the trunk line in place of the pump. The valve may be electrically operated, in which instance, the lines 277 and 278 are so joined to it so that the valve is opened automatically when the valves in the branch lines are opened. It will also be apparent that when gravity is relied upon to produce flow of fluids, a manually operated valve may be used in place of the pump. In that instance, the lines 277 and 278 may be joined to a signal such as a light or an audible signal designed to appraise the operator when a single branch line on each manifold is opened. The operator can then open the valve in the trunk line to allow the fluid to flow. The signals 292 appraise the operator if the valves in the branches are properly paired.

The lines 277 and 278 are shown as being directly connected to motor 119. However, it is obvious that they may be joined to a starting device which functions to control the flow of current to the motor from an independent circuit.

It is apparent that the split arrangement of the first switches 222 and 267 are the electrical equivalents of the end three-way switches as shown in Figs. 4, 5, 6, 8, 9, etc.; all of the end switches by reason of the arrangement of connections may be regarded as three-way, even though they are shown as having points and blades adapting them for use as double pole, double throw switches.

All of the separate sections of the switches need not be combined in single switch housings. They may be separate units appropriately mounted.

The forms of the invention herein shown are by way of illustration. It will be apparent that numerous modifications may be made therein without departure from the spirit of the invention or the scope of the appended claims.

I claim:

1. Apparatus for passing a plurality of different liquids through a common trunk conduit without intermixing the same, said apparatus comprising branch conduits for each liquid connected to said trunk conduit, each of said branch conduits having a hand operated valve having an operating stem disposed therein, a double throw electrical switch associated with each valve, each of said switches having a contact corresponding to the open position of the corresponding valve and a contact corresponding to the closed position of the corresponding valve, one of said switches having a third contact conductively joined to a power line, and the other of said switches having a middle contact which is conductively joined to electrically actuated means in the trunk line for controlling the flow of fluids therethrough, the first mentioned contact of one of said double throw switches being conductively connected across to the second mentioned contact of the second mentioned switch, and the second mentioned contact of the first mentioned switch being conductively joined to the first mentioned contact of the second of said switches, and a movable blade element in each switch joined to the middle contact and being actuated by opening and closing of the corresponding valve selectively to engage the open position contact or closed position contact of said switch, whereby opening of one valve actuates said means to effect flow of fluids through said trunk line and opening of a second valve while the first is open causes said electrical means to be inactivated to stop the flow of fluids.

2. Apparatus for passing a plurality of fluids through a common trunk conduit without intermixing the same, said apparatus comprising electrically-operated means in the trunk conduit adapted to control the flow of fluid therein and branch conduits, one for each fluid to be passed and opening into the common trunk conduit, each of said branch conduits having a valve with the body thereof disposed in the corresponding branch and a double throw electrical switch associated with each of said valves, one switch being connected in a power line and the other being connected to said electrically operated means each switch having one contact corresponding to the open position of the associated valve and a second contact corresponding to the closed position of said associated valve, each of said switches having an operating element selectively to make contact with said contacts and means on the valve stem to operate said operating element as the valve is opened or closed, said contacts being conductively interconnected by electrical conductors, the first contact of each switch being connected to the second contact of the other switch whereby when one valve is opened and the other is closed the circuit through the switch is closed to supply current to the electrically operated means and the circuit is opened when the second valve is opened or both valves are closed.

3. Apparatus for passing at least three different fluids through a common trunk conduit without intermixing the same, comprising electrically actuated means to control the flow of fluid through the trunk conduit, said apparatus comprising branch conduits, one for each liquid connected to said trunk conduit, each of said branch conduits having a valve disposed therein and an electrical switch associated with each valve, the switches being connected in series, the switches upon two of the valves being double throw and defining the end switches of the series, each switch having a middle connection and the middle connection of one of the end switches being connected to a power line, the middle connection of the second end switch being joined to the electrically actuated means, said end switches further each comprising a contact corresponding to the open position of the associated valve and a contact corresponding to the closed position of the same valve, the third switch of the series comprising a double throw section, also having a contact corresponding to the open position of the associated valve and a contact corresponding to the closed position of the same valve, the third switch further having a single throw section with a contact corresponding to the closed position of the associated valve, and crossed conductors connecting the open position contacts of the first double throw switch with the closed position contact of the third switch and connecting the closed position contact of the first double throw switch with the open position contact of the double throw section, and also crossed conductors connecting the third switch with the contacts of the second double throw switch, and blade means for the two double throw switches and for the double throw and single throw sections, said blade means being operatively connected to the associated valve means and selectively engaging the open and closed position contacts as the valves are opened or closed, the blade means of the first double throw switch being joined to the power line and the blade means of the double throw section being joined to the closed position contact of the second double throw switch, and the blade means of the single throw section being joined to the open position contact of the latter switch, whereby the opening of any single valve permits the flow of power to said electrical means and the opening of any second valve shuts off the flow of power.

4. Apparatus for passing at least three fluids through a common trunk conduit without intermixing the same, said apparatus comprising electrically operated means in the trunk conduit adapted to control the flow of fluid therein and at least three branch conduits, one for each of said fluids to be passed and being joined to the common trunk conduit, each of said branch conduits having a valve having a body disposed in the corresponding branch conduit and a double throw switch associated with each of said valves, two of the switches being terminal switches in a series, one of a pair of said terminal switches being connected to a power line and the other of said pair being connected by an electrical conductor to said electrically operated means, each of said terminal switches having one contact corresponding to the open position of the associated valves and the second contact corresponding to the closed position of said associated valve, each of said switches having an operating element for selectively contacting one of said contacts and means on the valve stem to operate said element as the valve is opened or closed, said contacts being conductively interconnected by parallel electrical conductors, the first contact of each of said terminal switches being connected to the second contact of the other terminal switch, an intermediate switch associated with a third valve and comprising a double throw section and having spaced contacts corresponding to the opened and closed positions of the third valve, the contact corresponding to the closed position of the valve being in series with one of the electrical conductors and a single throw section disposed in series with the other electrical conductor, the two sections being mechanically interconnected whereby when the third valve is operated the sections are operated in unison, the single throw section being opened when the valve is opened and closed when the valve is closed, and a cross-over conductor between the contact of the single throw section and the contact of the double throw section corresponding to the open position of the third valve, whereby when a single valve is opened the circuit through the switches is closed to supply current to the electrically operated means and to open the circuit when all of the valves are closed or more than one valve is open.

5. Apparatus as defined in claim 4 in which the branch conduits previously defined constitute a first set, the trunk conduit being provided with second set corresponding to the first set, said second set of branch conduits also being provided with a second set of valves and a second set of associated switches with circuits corresponding to those of the first set of switches, the valves of both sets further being associated with individual switch means, operable by opening and closing of the corresponding valves, the switches of corresponding valves in the two sets being in series with each other and in series with electrical means assuring that the valves will be opened and closed in phase with each other the two sets of switches and the circuits thereof being in series with each other.

6. Apparatus as defined in claim 5 in which the latter recited electrical means comprises an electrically operated signal informing when the valves are in correct phase with respect to each other.

7. Apparatus for passing a plurality of different fluids through a common trunk conduit without intermixing the same, said apparatus comprising branch conduits for each liquid, connected to said trunk conduit, each of said branch conduits having a valve disposed therein and electrical switches associated with the valves, one for each of said valves, said switches being double throw and each having a contact corresponding to the open position of the corresponding valve and a contact corresponding to the closed position of the same valve, a pair of connecting lines between the switches and defining a conductor from the closed position contact of one switch to the open position contact of the other, and a conductor from the open position contact of the first switch to the closed position contact of the second switch, switch blade means for each switch and means actuated by closing of each of the valves selectively to bring the blade means into engagement with the closed position contact of the corresponding switch and by opening of the same valves to bring the blade means into contact with the open position contact, the switches associated with one valve being conductively connected to a power line and the switch associated with the second valve being conductively connected to an electrical device for controlling the flow of fluid in said trunk conduit, said blade means of one switch selectively contacting with the contacts thereof and bridging between said power line and said connecting lines in accordance with the open or closed position of the first mentioned valve, the blade means of the second switch selectively bridging between the electrical device for controlling the flow of fluid in the trunk conduit and said connecting lines in accordance with the open or closed position of the second mentioned valve.

8. Apparatus as defined in claim 7 and further comprising a third valve and an associated switch, the switch associated with the third valve comprising a double throw section and having spaced contacts corresponding respectively to the open and closed positions of the third valve, and the blade means selectively engaging the contacts and being operatively connected with said third valve so that it selectively engages the contacts of said double throw section in accordance with the open or closed position of the valve, the contact corresponding to the closed position of the third valve being in series with one of the connecting lines to the open contact point of the first switch; the switch corresponding to the third valve further having a single throw section disposed in series with the other electrical connecting line to the first switch, and a cross-over conductor between the contact of the single throw section and the contact of the double throw section corresponding to the closed position of the valve, the single throw section further having blade means engaging the contact thereof, the blade means of the two sections having means operatively interconnecting them with the third valve, whereby when a single valve is opened, the circuit through the switches is closed to supply current to the electrical device for controlling the flow of fluids and to open the circuit when all of the valves are closed or more than one valve is opened.

9. In a system for transporting at least three liquids through a common trunk conduit line without mixing of the fluids, branch conduits, one for each liquid from said trunk line, valves in the branches, electrically operated means controlling the flow of fluids through the trunk, electrical switches associated with and operated by opening and closing of the valves, the end switches of the series being in effect three way, one end switch being connected to a power line, the other end switch being connected to said electrically operated means and two terminals of one of said end switches being connected to two terminals of the other through parallel conductors, one of said conductors being joined in series with two spaced contacts of a three-way switch section of an intermediate switch means in the series and the other conductor being joined to two spaced contacts of a single pole, single throw section of said intermediate switch means, and a cross conductor between the last conductor and the third terminal of the three-way section, said switch sections being simultaneously operated by opening and closing of a third valve.

References Cited in the file of this patent

UNITED STATES PATENTS

| | | |
|---|---|---|
| 792,258 | Grinnell | June 13, 1905 |
| 896,864 | Spamer | Aug. 25, 1908 |
| 2,034,420 | Reiland | Mar. 17, 1936 |
| 2,628,720 | Hungerford | Feb. 17, 1953 |
| 2,752,944 | Temple | July 3, 1956 |